United States Patent Office 3,573,252
Patented Mar. 30, 1971

3,573,252
N-NITROSO-4,4'-BIS(2-PHENYLISOPROPYL)-DIPHENYLAMINE
Guy Bertrand, Choisy-le-Roi, and Jean-Marc Maison, Paris, France, assignors to Rhone-Poulenc SA., Paris, France
No Drawing. Filed Sept. 5, 1968, Ser. No. 757,757
Claims priority, application France, Sept. 20, 1967, 121,670
Int. Cl. S08f 45/60
U.S. Cl. 260—45.9                 4 Claims

ABSTRACT OF THE DISCLOSURE

N-nitroso-4,4'-bis(2-phenylisopropyl)diphenylamine, a new compound, is valuable as a vulcanisation retarder for elastomers. It has an anti-ageing effect on the vulcanised product.

---

The present invention provides a new compound which is useful as a retarder of the vulcanisation of natural and synthetic rubbers and which furthermore possesses valuable properties of protection against deterioration due to the ageing of vulcanised articles.

It is well known that during the various stages of using a mixture based on rubber and containing the ingredients required for vulcanisation, in particular sulphur and vulcanisation accelerators, prolonged heatings take place which can lead to premature vulcanisation. Such pre-vulcanisations make the mixtures unsuitable for their subsequent conversion.

The risks of pre-vulcanisation may be reduced by using a retarded-action acceleration such as, for example, an accelerator of the sulphenamide class and/or by adding to the composition a vulcanisation retarder, also called an anti-scorching agent. The effect of such a vulcanisation retarder must be limited to the stage of using the mixture only and must cease during the vulcanisation at a higher temperature so as not to increase the duration of cure of the mixtures.

It is also well known that vulcanised rubber over the course of time undergoes considerable degradation which is, in particular, due to the action of oxygen and heat as well as to the particular conditions of use of the finished article. It is accordingly desirable to protect vulcanised rubber against the destructive effect of these various factors.

Up to now numerous products are known which can be used to combat the risks of scorching of raw mixtures, for example organic anhydrides and acids such as phthalic anhydride, salicylic acid, and nitroso-amine derivatives such as nitrosodiphenylamine. All these products are effective under certain conditions, but they are not always completely satisfactory because the former, the organic anhydrides and acids, do not completely have the desired effect on accelerators of the sulphenamide class, while nitrosodiphenylamine strongly colours the vulcanisation mixtures, so that the latter mixtures can mark lacquers and paints by contact.

Very many chemical substances are also known which may be used to protect vulcanised rubber articles against ageing.

The present invention provides a new compound which simultaneously possesses both valuable retarder properties, and also the protective properties which are indispensable for good preservation of vulcanised rubber articles. This new compound is N-nitroso-4,4'-bis-(2-phenylisopropyl)-diphenylamine. This new compound has the formula:

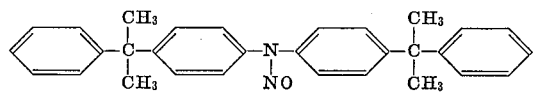

Its melting point is 100° C., its absorption maximum at 298 m$\mu$, $$E_{1\ cm.}^{1\%} = 130$$

and its absorption minimum at 275 m$\mu$, $$E_{1\ cm.}^{1\%} = 124$$

This compound is a very effective retarder for counter-acting the scorching of mixtures based on natural rubber or on synthetic unsaturated elastomers such as styrene-butadiene and butadiene-acrylonitrile copolymers, polybutadiene, polyisoprene, and generally all unsaturated elastomers which can be vulcanised with sulphur. N-nitroso-4,4'-bis(2-phenylisopropyl)-diphenylamine is used in an amount generally from 0.1 to 5 parts by weight (preferably 0.25 to 2 parts) per 100 parts by weight of the unsaturated elastomer.

N - nitroso - 4,4'-bis(2-phenylisopropyl)-diphenylamine does not significantly interfere with the vulcanisation proper either from the point of view of speed or from the point of view of the properties of the vulcanised product. The new compound also makes it possible to prepare vulcanised rubber articles of much retarded degradation, and it has the additional advantage, namely that it causes considerably less severe marking of lacquers and paints than that caused by N-nitrosodiphenylamine.

The product of the invention may be prepared from 4,4'-bis(2-phenylisopropyl)-diphenylamine by any process of introducing the nitroso group. It is, for example, possible to disperse 4,4'-bis(2-phenylisopropyl)-diphenylamine in water at a suitable temperature (for instance at about 90° C.) and add a sufficient quantity of sodium nitrite and a strong inorganic acid, such as for example hydrochloric acid or sulphuric acid, to carry out the introduction of the nitroso group, and to separate the resulting product in any desired manner, such as for example by filtration after cooling or by decantation of the liquids organic layer.

The use of the new compound of the invention in mixtures based on rubber is illustrated in the following examples:

EXAMPLE 1

This example shows the influence of the concentration of N - nitroso-4,4'-bis(2-phenylisopropyl)-diphenylamine on scorching in a mixture based on natural rubber filled with carbon black.

The following mixture is prepared in a laboratory internal mixer:

|  | Parts by weight |
|---|---|
| Natural smoked rubber sheet | 100 |
| Zinc oxide | 5 |
| Stearic acid | 2 |
| High abrasion furnace carbon black | 50 |
| Pine tar | 3 |

The following ingredients are added to the above mixture on a roll mill:

| | Parts by weight |
|---|---|
| Sulphur | 2.25 |
| N-cyclohexylbenzothiazylsulphenamide | 0.50 |
| N - nitroso - 4,4' - bis(2-phenylisopropyl)-diphenylamine (as indicated below). | |

After being left for 24 hours, the scorching time of the mixtures is measured on a consistometer of the Mooney type at 120° and 130° C.

The mixtures are vulcanised in a press at 143° C. as 4 mm. thick sheets for various times and the properties of the vulcanised articles thus obtained are measured as a function of the duration of the vulcanisation.

The results obtained are shown in Table I.

TABLE I

| | N-nitroso-bis(2-phenylisopropyl)diphenylamine (parts by weight) | | |
|---|---|---|---|
| Properties measured | 0 | 0.50 | 1.00 |
| Scorching time (min.) at— | | | |
| 120° C | 22.5 | 25.00 | 28.75 |
| 130° C | 13.5 | 14.75 | 16.25 |
| Vulcanisation at 143° C., tear resistance (kg./cm.²) after— | | | |
| 20 minutes | 246 | 245 | 233 |
| 25 minutes | 246 | 248 | 243 |
| 30 minutes | 246 | 248 | 249 |
| Modulus at 300% (kg./cm.²) after— | | | |
| 20 minutes | 110 | 110 | 104 |
| 25 minutes | 116 | 118 | 113 |
| 30 minutes | 120 | 123 | 117 |
| Elongation at break, (percent) after— | | | |
| 20 minutes | 550 | 535 | 535 |
| 25 minutes | 535 | 535 | 530 |
| 30 minutes | 510 | 510 | 530 |

These results show that N-nitroso-4,4'-bis(2-phenylisopropyl)diphenylamine increases the scorching time with practically no modification of properties of the vulcanised articles.

If the N-cyclohexylbenzothiazylsulphenamide in the vulcanisable composition is replaced by an equal weight of 2-(N-morpholinothio)-benzothiazole, the relative variations of the scorching time as a function of the concentration of N-nitroso-4,4'-bis(2-phenylisopropyl)diphenylamine remain on the same order of magnitude.

EXAMPLE 2

This example shows the influence of N-nitroso-4,4'-bis(2-phenylisopropyl)-diphenylamine on the scorching of a mixture based on butadienestyrene copolymer containing white fillers.

The following mixture is prepared on a roll mill:

| | Parts by weight |
|---|---|
| Styrene-butadiene copolymer of type 1502 | 100 |
| Zinc oxide | 5 |
| Stearic acid | 2.5 |
| Ultra-fine silica | 22.5 |
| Kaolin | 22.5 |
| Totanium dioxide | 10 |
| Diethylene glycol | 3.5 |
| Sulphur | 2 |
| Zinc mercaptobenzothiazolate | 1.2 |
| Zinc dimethyldithiocarbamate | 0.3 |
| N-nitroso-4,4'-bis(2-phenylisopropyl)-diphenylamine (as indicated below). | |

After being left for 24 hours, the scorching time of the mixtures is measured on a consistometer of the Mooney type at 120° C. Furthermore the mixtures are vulcanised in a press at 153° C. and the properties obtained at the optimum vulcanisation time (the shortest vulcanisation time producing the highest modulus at 500%) are measured.

Finally, the raw mixtures are stored for 15 days at ambient temperature and their scorching time at 120° C. is again measured.

The results are given in Table II below.

TABLE II

| | N-nitroso-4,4'-bis-(2-phenylisopropyl)diphenylamine (parts by weight) | | |
|---|---|---|---|
| Properties measured | 0 | 0.5 | 1 |
| Scorching time at 120° C.: | | | |
| After preparation of the mixtures | 9 | 14.50 | 15.50 |
| After storage for 15 days | 7 | 22.50 | 28.50 |
| Vulcanisation at 153° C.: | | | |
| Optimum time (minutes) | 15 | 15 | 15 |
| Tear strength (kg./cm.²) | 98 | 102 | 103 |
| Modulus at 500% (kg./cm.²) | 28 | 29 | 30 |
| Elongation at break (percent) | 750 | 765 | 760 |
| Shore A hardness | 54 | 54 | 54 |

EXAMPLE 3

This example shows the protective properties of N-nitroso-4,4'-bis(2-phenylisopropyl)diphenylamine against heat ageing of vulcanised mixtures.

Mixtures, which are vulcanised at 145° C. for the optimum time are prepared as in Example 1. The vulcanised articles obtained are introduced, as samples, into a circulating air oven at 80° C. and the change in strength and elongation at break are measured. The time required to achieve a certain reduction of the properties measured is then determined. Mixtures were also prepared as in Example 1 but replacing the N-nitroso-4,4'-bis(2-phenylisopropyl)-diphenylamine by N-nitrosodiphenylamine.

The results obtained are shown in Table III.

TABLE III

| | N-nitroso-4,4'-bis(2-phenylisopropyl)-diphenylamine (parts by weight) | | | | N-nitrosodiphenylamine (parts by weight) | |
|---|---|---|---|---|---|---|
| | 0 | 0.25 | 0.50 | 1 | 0.5 | 1 |
| Time required to achieve a reduction in tear strength of 50%, days | 6½ | 10 | 11½ | 13 | 7½ | 8½ |
| Time required to achieve a reduction of elongation at break of 50%, days | 9½ | 14 | 15 | 16 | 9½ | 10½ |

The excellent protection afforded by the compound of the invention relative to the control material and also relative to nitrosodiphenylamine can clearly be seen.

EXAMPLE 4

A further advantage of N-nitroso-4,4'-bis(2-phenylisopropyl)-di-phenylamine compared to N-nitrosodiphenylamine, namely its much less pronounced marking of lacquers and paints, is demonstrated in this example.

Mixtures prepared as in Example 1 are vulcanised for the optimum time at 143° C. Samples of these vulcanised articles are brought into contact with a white alkyd paint deposited on a metallic support. The time for the appearance of a coloration on the paint is observed with each of the two diphenylamine derivatives.

| | Parts by weight | Time for appearance of a coloration in the paint Hours |
|---|---|---|
| Control | | 90 |
| N-nitroso-4,4'-bis(2-phenylisopropyl)-diphenylamine | 0.5 | 75 |
| | 1 | 75 |
| N-nitrosodiphenylamine | 0.5 | 27 |
| | 1 | 19 |

EXAMPLE 5

The following composition, with the figures expressing parts by weight, is prepared with the aid of a mixer.

| | |
|---|---|
| Cis-1,4-polybutadiene | 100 |
| Zinc oxide | 5 |
| Stearic acid | 3 |
| ISAF carbon black | 50 |
| Pine tar | 10 |

The following ingredients (parts by weight) are then added thereto on a roll mill

| | |
|---|---|
| Sulphur | 1 |
| N-cyclohexylbenzothiazylsulphenamide | 2 |
| N-nitroso - 4,4'- - bis(2-phenylisopropyl)-diphenylamine as indicated below. | |

After being left for 24 hours, the scorching time of the mixtures is measured on a consistometer of the Mooney type at 130° C. Furthermore the properties of mixtures vulcanised at 153° C. are measured as a function of the duration of vulcanisation. The results are collected in Table IV.

TABLE IV

| | N-nitroso-4,4'-bis(2-phenylisopropyl)diphenylamine (parts by weight) | | | | | |
|---|---|---|---|---|---|---|
| | 0 | | | 1 | | |
| Scorching time at 130° C. (in minutes) | 26.25 | | | 30.25 | | |
| Vulcanisation at 153° C.: | | | | | | |
| Duration (in minutes) | 20 | 25 | 30 | 20 | 25 | 30 |
| Tear strength (kg./cm.²) | 129 | 140 | 133 | 128 | 134 | 122 |
| 300% modulus (kg./cm.²) | 63 | 63 | 62 | 57 | 59 | 60 |
| Elongation at break percent | 300 | 525 | 505 | 510 | 525 | 485 |

EXAMPLE 6

This example differs essentially from Example 5 by the replacement of the polybutadiene by polyisoprene.

The following mixture (in parts by weight) is prepared in a laboratory internal mixer

| | |
|---|---|
| Cis-1,4-polyisoprene | 100 |
| Zinc oxide | 5 |
| Stearic acid | 3 |
| High abrasion furnace carbon black | 50 |
| Dutrex V 10 (plasticiser obtained from petroleum) | 3 |

The following ingredients are added to this mixture on a roll mill:

| | |
|---|---|
| Sulphur | 2.5 |
| N-cyclohexylbenzothiazylsulphenamide | 1 |
| N-nitroso - 4,4' - bis(2-phenylisopropyl)-diphenylamine as indicated. | |

The results obtained are shown in Table V.

TABLE V

| | N-nitroso-4,4'-bis(2-phenylisopropyl)-diphenylamine (parts by weight) | | | | | |
|---|---|---|---|---|---|---|
| | 0 | | | 1 | | |
| Mooney scorching time, minutes: | | | | | | |
| At 120° C | 32 | | | 35.75 | | |
| At 130° C | 17.75 | | | 20 | | |
| Vulcanisation at 143° C.: | | | | | | |
| Duration (minutes) | 17.5 | 20 | 25 | 17.5 | 20 | 25 |
| Tear strength (kg./cm.²) | 232 | 255 | 232 | 254 | 259 | 234 |
| 300% modulus (kg./cm.²) | 123 | 132 | 138 | 107 | 115 | 127 |
| Elongation at break (percent) | 480 | 505 | 445 | 555 | 545 | 475 |

EXAMPLE 7

This example essentially differs from Example 5 by the replacement of the polybutadiene by a styrene-butadiene copolymer.

The following mixture (parts by weight) is prepared in a laboratory internal mixer

| | |
|---|---|
| Styrene-butadiene copolymer, type 1509 | 100 |
| Zinc oxide | 5 |
| Stearic acid | 2 |
| High abrasion furnace carbon black | 50 |
| Dutrex V 10 | 8 |

The following ingredients are added to the above mixture on a roll mill:

| | |
|---|---|
| Sulphur | 2 |
| N-cyclohexylbenzothiazylsulphenamide | 1 |
| N-nitroso - 4,4' - bis(2-phenylisopropyl)-diphenylamine as indicated below. | |

The results obtained are shown in Table VI.

TABLE VI

| | N-nitroso-4, 4'-bis(2-phenylisopropyl)-diphenylamine (parts by weight) | |
|---|---|---|
| | 0 | 1 |
| Mooney scorching time (in minutes): | | |
| At 120° C | 46 | 55.25 |
| At 130° C | 14.5 | 16.25 |
| Vulcanisation at 153° C.: | | |
| Duration (minutes) | 30 35 | 35 40 |
| Tear strength (kg./cm.²) | 198 184 | 162 182 |
| 300% modulus (kg./cm.²) | 93 93 | 75 77 |
| Elongation at break (percent) | 495 460 | 525 530 |

We claim:
1. A vulcanisable composition comprising natural rubber or a synthetic unsaturated elastomer vulcanisable with sulphur, and a stabilizing amount of N-nitroso-4,4'-bis(2-phenylisopropyl)diphenylamine.
2. A composition according to claim 1 comprising from 0.1 to 5 parts of the said compound per 100 parts by weight of the said elastomer.
3. A composition according to claim 2 comprising from 0.25 to 2 parts of the said compound.
4. The product of vulcanising a composition as claimed in claim 1.

References Cited
UNITED STATES PATENTS

| 1,869,657 | 8/1932 | Bowers | 260—45.9 |
| 2,035,698 | 3/1936 | Fisher | 260—45.9 |
| 2,897,177 | 7/1959 | Tung | 260—45.9 |
| 2,931,785 | 4/1960 | Beaver et al. | 260—45.9 |
| 3,384,613 | 5/1968 | Parks | 260—45.9 |
| 3,505,225 | 4/1970 | Wheeler | 260—45.9 |

HOSEA E. TAYLOR, Primary Examiner

U.S. Cl. X.R.

260—23.7, 41.5, 570, 781, 806, 808